United States Patent [19]

Kitayama

[11] Patent Number: 4,645,053
[45] Date of Patent: Feb. 24, 1987

[54] DAMPER DISC

[75] Inventor: Kozi Kitayama, Neyagawa, Japan

[73] Assignee: Kabushiki Kaisha Daikin Seisakusho, Osaka, Japan

[21] Appl. No.: 751,411

[22] Filed: Jul. 3, 1985

[30] Foreign Application Priority Data

Jul. 5, 1984 [JP] Japan .......................... 59-102279[U]

[51] Int. Cl.⁴ ............................................... F16D 3/66
[52] U.S. Cl. .................................... 192/106.2; 464/68
[58] Field of Search .............. 192/106.2, 106.1, 70.17, 192/70.18, 30 V; 464/68

[56] References Cited

U.S. PATENT DOCUMENTS 4,485,907 12/1984 Nishimura ..................... 192/70.17 X Primary Examiner—George H. Krizmanich
Attorney, Agent, or Firm—Armstrong, Nikaido, Marmelstein & Kubovcik

[57] ABSTRACT

A damper disc having a pair of annular side plates arranged on opposite sides of a flange of a spline hub connected to an output shaft. A torsion spring connected to the side plates and the hub flange and arranged in holes provided on the side plates and the hub flange. A pair of annular side plates having inner peripheral parts are connected by stud pin against the opposite surfaces of the hub flange. The stud pin are passed through a notch of the hub flange with a clearance provided therebetween with an angle larger than a first-stage twist angle and, at the same time, through notches of the side plates, with a clearance provided therebetween with an angle larger than a second-stage twist angle. A stop pin connects the outer peripheral parts of the side plates and is passed through a notch of the hub flange with a clearance provided therebetween corresponding to a maximum twist angle. A friction material, having a friction washer through which the stud pin passes, are disposed between subplates and the side plates. An engage part engaging with the torsion spring is formed on the friction washer. Clearance between the friction washer and the stud pin is eliminated by means of a twist caused by the torsion spring.

6 Claims, 8 Drawing Figures 4,645,053

DAMPER DISC

BACKGROUND OF THE INVENTION

Useful industrial Field

This invention relates to a damper disc suitable for a large-size damper disc and especially to a low-noise damper disc.

PRIOR ART

In a conventional damper disc of this type, noise has been reduced by generating two-stage hysteresis torques. In such a conventional design, the clutch strength has been improved by producing an angle of delay in a second stage hysteresis torque. However, this design includes a problem that an excessively large angle of delay causes a 'humming sound'.

OBJECT OF THE INVENTION

An object of this invention is to provide a damper disc which can prevent the 'humming sound'.

COMPOSITION OF THE INVENTION

A damper disc, in which a pair of annular side plates to which outer peripheral parts a torque is transmitted are arranged on both sides of a flange of a spline hub connected to an output shaft. A torsion spring connecting the side plates and the hub flange is arranged in holes provided on the both side plates and said hub flange. A pair of annular side plates, inner peripheral parts of which are connected by stud pin, are faced against surfaces of both side plates opposite to the hub flange. The stud pin is passed through a notch of the hub flange with a clearance provided therebetween having a larger angle than a first-stage twist angle and at the same time through notches of the side plates with a clearance provided therebetween corresponding to an angle larger than a second-stage twist angle. A stop pin connecting outer peripheral parts of the both side plates is passed through a notch of the hub flange with a clearance provided therebetween corresponding to a maximum twist angle. A friction material having a friction washer through which the stud pin passes is disposed between subplates and the side plates. An engaging part contacting with the torsion spring is formed on the friction washer. A clearance between the friction washer and the stud pin is eliminated by means of twist caused by the torsion spring.

DESCRIPTION OF THE INVENTION

Embodiment

Figure 1:
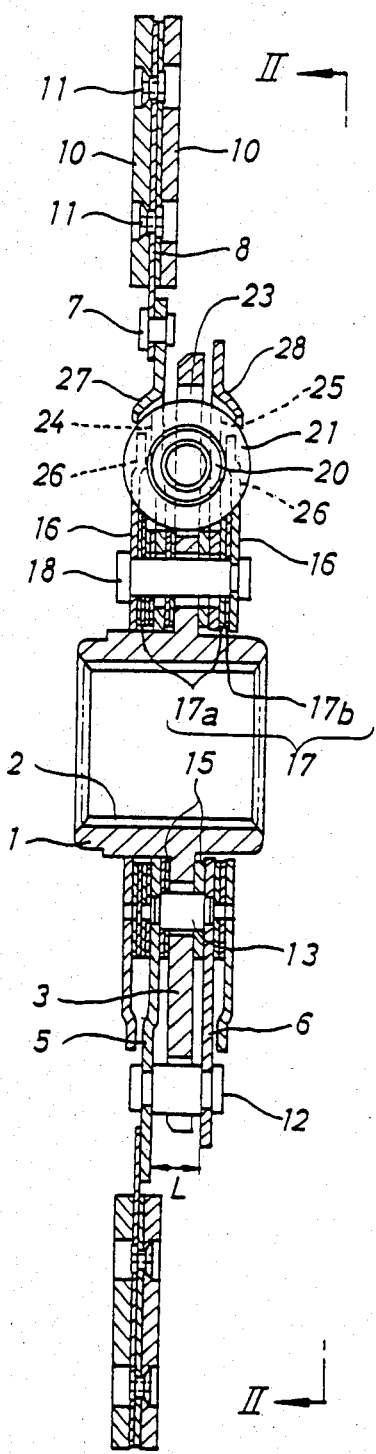
FIG. 1 is a vertical sectional view of an embodiment according to this invention.

In FIG. 1 which is the vertical sectional view of the clutch disc according to this invention, a spline hub provides on its inner peripheral surface a spline tooth 2 fitting onto a not-shown output shaft (main drive shaft), and provides an annular hub flange 3 on its outer peripheral surface. Annular side plates 5 and 6 are positioned on both sides of the hub flange 3, a cushioning plate 8 is fixed by a rivet 7 to an outer peripheral surface of the side plate 5 (clutch plate) at the left side of the figure, and friction facings 10 & 10 are lined on both sides of the plate 8 by rivets 11. An outer peripheral part of the side plate 5 is connected through a stop pin 12 to an outer peripheral part of the other side plate 6 (retaining plate), and a small end of a spacer pin 13 fits into holes at inner peripheral parts of the both plates 5 and 6. A first friction material 15 (friction washer, wave spring etc.) having a small friction force is interposed between inner peripheral parts of the plates 5 and 6 and the flange 3.

Annular sub-plates 16 and 16 face against surfaces of the both side plates 5 and 6 opposite to the flange 3, and a second friction material 17 composed of a friction washer 17a, a wave spring 17b etc. is interposed between inner peripheral parts of the sub-plates 16 and the side plates 5 and 6. The inner peripheral parts of the both sub-plates 16 and 16 are connected by a stud pin 18, the pin 18 strongly pulls both plates 16 and 16 toward each other to compress the second friction material 17 and increase the friction force of the second friction material 17. Because both side plates 5 and 6 are connected and supported each other by the stepped portion of spacer pin 13, a pressing force applied from the second friction material 17 to the plates 5 7 6 is not applied directly to the first friction material 15. Therefore, the compression force applied to first friction material 15 is small so that its friction force becomes small as mentioned before. Further, the friction forces of friction mateial 15 and 17 are also differentiated, as mentioned above, by making smooth a slide surface of the first friction material 15 and by making rough a slide surface of the second friction material 17.

20 and 21 are torsion springs (compression coil springs) of small dia. and large dia., respectively positioned concentrically and extending in a clutch circumferential direction (direction normal to a surface of FIG. 1), and are fitted in holes 23, 24 and 25 provided at opposed positions of the flange 3 and side plates 5 and 6. Left and right sides of the large dia. spring 21 in FIG. 1 also fit in notches 26 and 26 at the outer peripheral of subplates 16 and 16. Side plates 5 and 6 provide a hood-like bent portions 27 and 28 projecting on opposite sides of the flange 3 along outer peripheral edges of holes 24 and 25. Bent portions 27 & 28 contact with or are near the sides of spring 21 from outside viewing in a clutch radial direction so as not to permit the spring 21 to deviate from the holes 23, 24 and 25 in lateral direction of the figure. Further, inner peripheral surfaces of notches 26 and 26 of the sub-plates 16 and 16 are cut away obliquely along an outer peripheral surface of the spring 21, and the inner peripheral surfaces of the notch 26 contact with or get near to both sides of the spring 21 from an inside in the clutch radial direction so as not to permit the spring 21 to deviate from the holes 23, 24 and 25 in the lateral direction of the figure.

Figure 2:
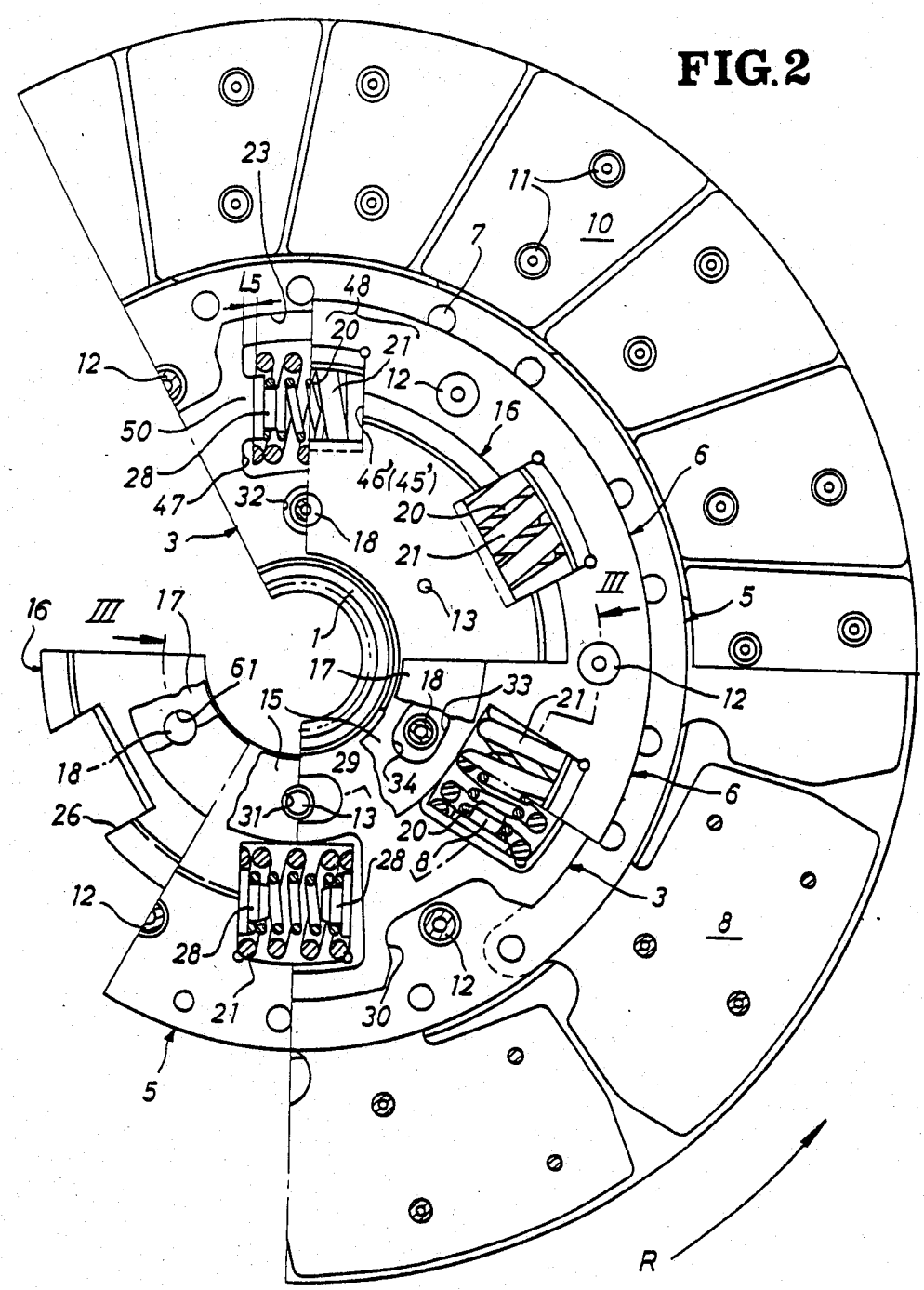
FIG. 2 is a partially fragmental sectional view taken from the line II—II of FIG. 1.

As shown in FIG. 2 which is the partially fragmental sectional view taken from line II—II of FIG. 1, six sets of combined springs composed of the large dia. and small dia. springs 21 and 20 are provided and spaced equally in a disc circumferential direction. A spring holder 28 is disposed on either side of each small dia. spring 20. Six stop pins 12 are also provided on side plates 5 and 6 and are spaced equally, each stop pin 12 passes through a notch 30 provided on the flange 3. Three sub-pins 13 and three stud pins 18 are provided respectively. The pins 13 and 18 are disposed and spaced equally one after another. The sub-pin 13 passes through a circumferentially long slot 29 provided on the flange 3, and an inner periphery of a hole 31 of the first friction material 15 fit close onto the pin 13. Stud pin 18 passes through hole 32 provided on the flange 3. Hole 32 is slotted in the circumferential direction of flange 3. Stud pin 18 also passes through slotted holes 33 & 34 in the side plates 5 and 6 and the first friction material 15. The sizes and shapes of the holes 33 and 34 are identical.

Figure 5:
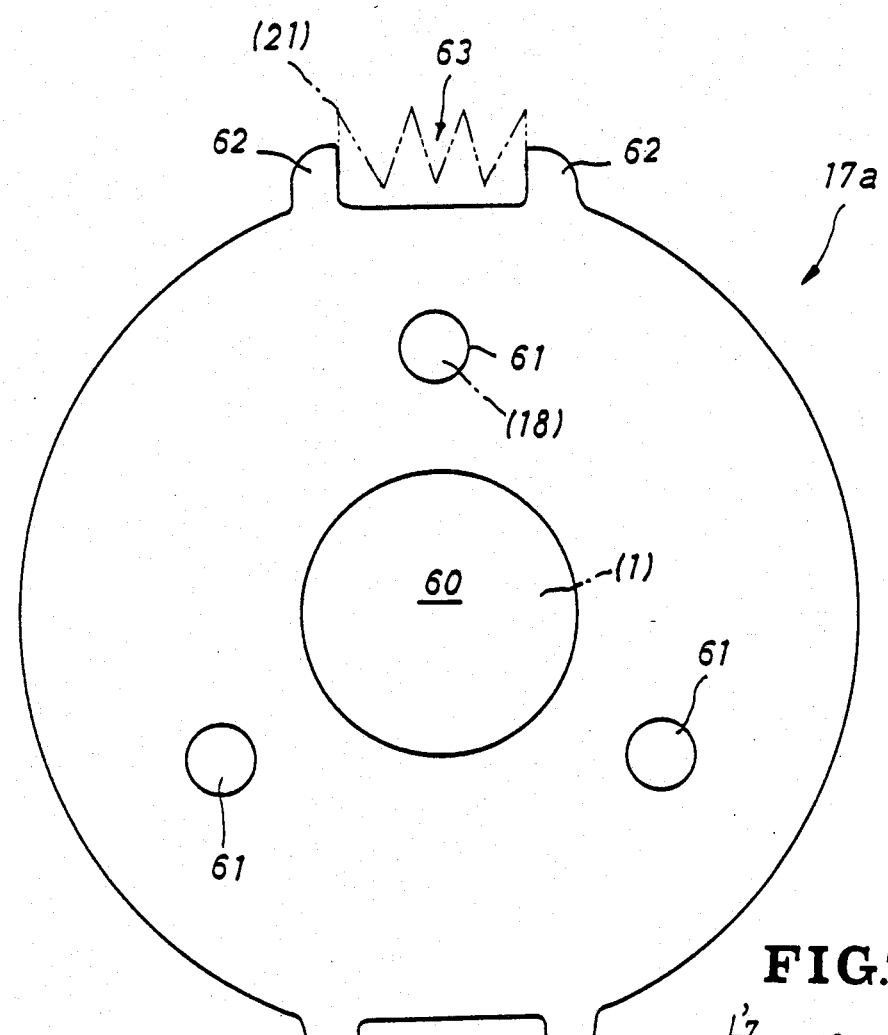
FIG. 5 is a plan view of a friction washer.
Figure 7:
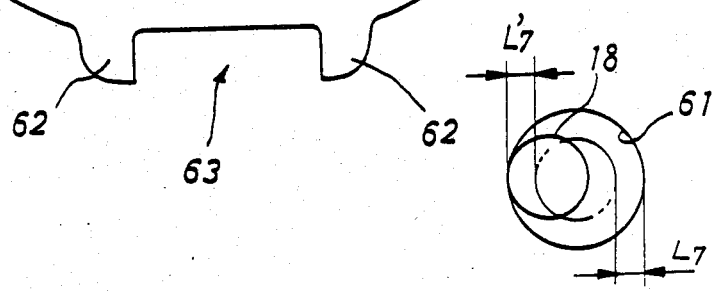
FIG. 7 is an enlarged view of a through hole of the friction washer.

The friction washer 17a of the second friction material 17 has a disc-like shape at a central part of which is formed a center hole 60 for fitting onto the spline hub 1 as shown in FIG. 5. Three through holes 61 for passing through the stud pins 18 are formed and spaced equally in the circumferential direction at a radially intermediate position of the friction washer 17a, and a diameter of the through hole 61 is made slightly larger than a diameter of the stud pin 18. An engage claw 62 (engage part) is provided radially outwardly at an outer peripheral edge of the friction washer. Two pairs of the engage claws 62 are disposed and spaced 180° apart so that they oppose each other with the center hole 60 put therebetween, and a pair of inner edges of the engage claw 62 are adapted to contact with both ends of the spring 21 to form an engage part 63. The friction material 17 is of steel plates having the strength of SK5 or SK5M steel. Wave spring 17b is of similar steel plates.

Figure 3:
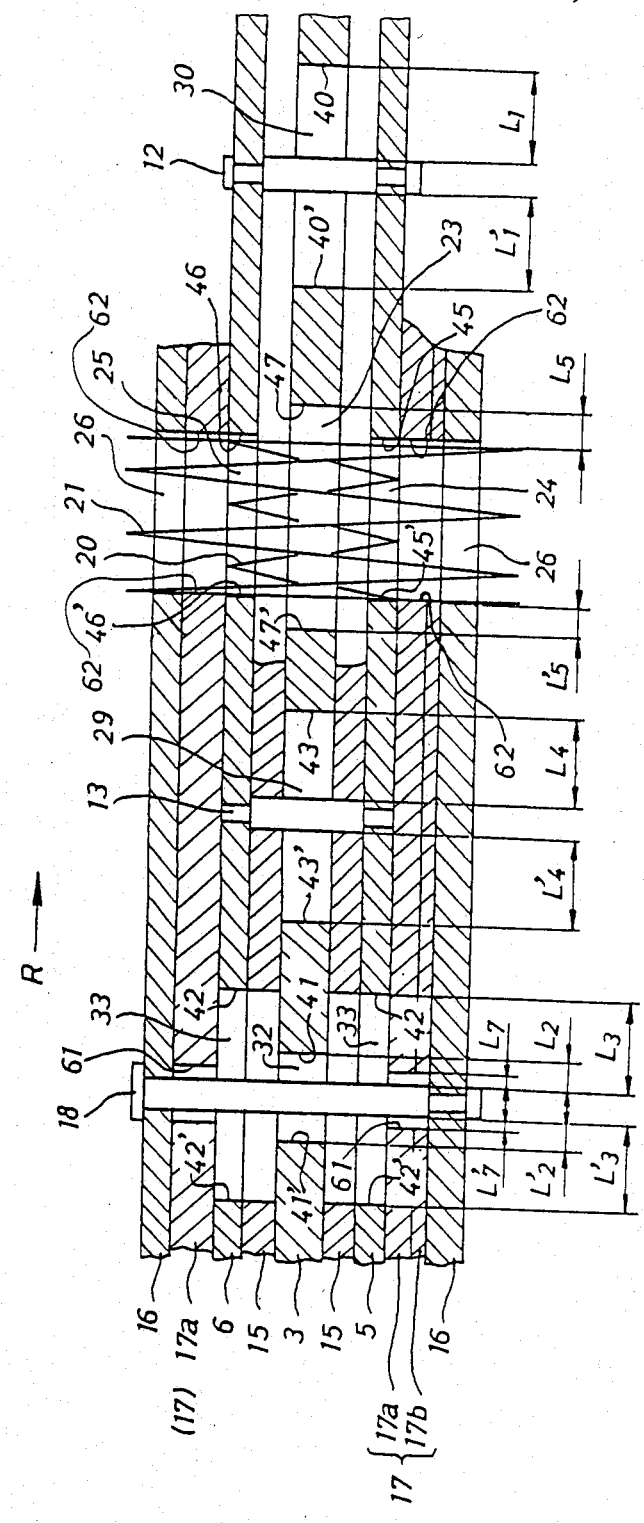
FIG. 3 is an enlarged schematic sectional view taken on a line III—III of FIG. 2.
Figure 4:
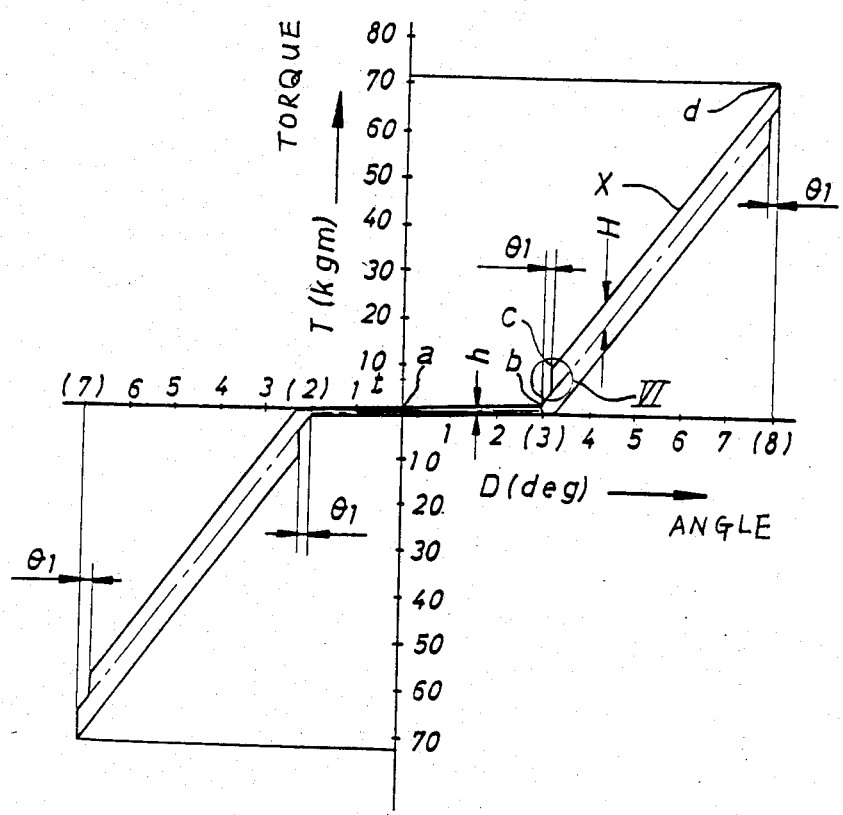
FIG. 4 is a graph of transmission-torque/twist-angle characteristic.

As shown in FIG. 3 which is the enlarged schematic sectional view taken on the line III—III of FIG. 2, when a twist angle D (FIG. 4) is 0°; a clearance $L_1$ corresponding to a maximum twist angle (for example, 8°: FIG. 4) of positive direction exists between the stop pin 12 and a right inside edge 40 of FIG. 3 of a notch 30 provided on the flange 3, and a clearance $L'_1$ corresponding to a maximum twist angle 7° of negative direction exists between the stop pin 12 and the opposite inside edge 40'. A right inside edge 41 and a left inside edge 41' of a slot 32 of the flange 3 are spaced from the stud pin 18 by clearances $L_2$ and $L_2'$ having a clearance angle $\theta_1°$ larger than first-stage twist angles 3° (positive direction) and 2° (negative direction) of FIG. 4. Both inside edges 42 and 42' of slots 33 and 33 of the side plates 5 and 6 are spaced from the pin by clearances $L_3$ and $L_3'$ corresponding to angles of more than positive and negative second-stage twist angles 5° and 5° (differences between the maximum twist angles and the above first-stage angles: 8°−3° and 7°−2°) of FIG. 4. Both inside edges 43 and 43' of a slot 29 of the flange 3 are spaced from the sub-pin 13 by clearances $L_4$ and $L_4'$ corresponding to angles of more than the maximum positive and negative twist angles 8° and 7°.

Under a state wherein the twist angle D is 0°, both ends of the springs 20 & 21 contact with both inside edges 45 and 45', 46 & 46' & engage claw 62 of holes 24 & 25 of the side plates 5 and 6. Both ends of five sets of springs 20 & 21, excluding one set of the combined spring 48 among six sets of springs 20 and 21 of FIG. 2, are spaced from both inside edges 47 and 47' of the hole 23 of the flange 3 by clearances $L_5$ and $L_5'$ corresponding to the positive and negative first-stage twist angle 3° and 2°, as shown in FIG. 3. As shown in FIG. 2, the hole in which the remaining one set of the combined spring 48 fits has projections 50 at the both inside edges 47 (only one is shown). The projections 50 contact with the spring holders 28 for the small-dia. spring 20, and inside edge portions other than the projections 50 are spaced from the large-dia. spring 21 by clearances identical with the clearances $L_5$ and $L_5'$ of FIG. 3. Further, the engage claw 62 of the friction washer 17a are contacted by the ends of spring 21 and by spring holders 28.

Stud pin 18 passes through through hole 61 with clearances $L_7$ and $L_7'$ left therebetween.

Function of the clutch disc will be described hereunder. Under the stationary state of FIG. 1 wherein the twist angle D is 0°, when the facing 10 is pressed toward a flywheel by a not-shown pressure plate and a torque is induced to the outer peripheral parts of the side plates 5 and 6, the disc will rotate in the direction of R of FIG. 2. While a transmission torque T (FIG. 4) is extremely small in this case, the side plates 5 and 6 will rotate integrally with the hub flange 3 by the action of the first friction material 15 and the torque T will be transmitted from the plates 5 and 6 through the first friction material 15 to the flange 3, the hub 1 and the output shaft.

When the torque gets beyond the above-mentioned minimum value (maximum friction force of the friction material 15), a slippage arises between the friction material 15 and the flange 3 to cause the side plates 5 and 6 to rotate relatively to the flange 3 in the rotating direction R of FIG. 2. Then, the small-dia. spring 20 in the combined spring 48 is compressed by the hole inside edges 45' and 46' of the side plates 5 & 6 and the projections 50 of the flange 3, and the torque begins to be transmitted from the plates 5 and 6 through one small-dia. spring 20 to the flange 3. Further, the sub-plates 16 and 16 are moved integrally with the side plates 5 and 6 by the action of the second friction material 17. Since the spring 20 transmitting the torque is one weak spring in that case, only a slight increase in the torque T will cause a sharp increase in the twist angle D of the plates 5 and 6 in relation to the flange 3 as shown in FIG. 4. Namely, a gradient of the transmission-torque/twist-torque characteristic X becomes very moderate as shown by a section a–b. Moreover, a small hysteresis torque h is produced in the characteristic X during the above travel due to the slippage of the first friction material 15 as shown by FIG. 4.

When the twist angle reaches $3° + \theta_1°$, the sub-plates 16 and 16 of FIG. 3 also reach a position where they are twisted by 3° relatively to the flange 3, and the stud pin 18 moves by a length of the clearance $L_2$ and contacts with the hole inside edge 41 of the flange 3. Thereafter, the notch 26 of the sub-plates 16 and 16 are spaced a clearance of angle $\theta_1°$ corresponding to the notch 47 of the flange 3, and the torque begins to be transmitted from the side plates 5 and 6 through the second friction materials 17 and 17, the sub-plates 16 and 16 and the stud pin 18 to the flange 3. While the transmission torque T of FIG. 4 is smaller than a specified value t under this state, a slippage will not be produced in the friction material 17 and therefore the twist angle D remains at 3°. Further, when the twist angle D reaches 3°, the springs 20 & 21 (the remaining five lsmall-dia. springs 20 and the six large-dia. springs 21) held by the side plates 5 and 6 of FIG. 3 also move by a length of the clearance $L_5$ to become contacting with the hole inside edge 47 of the flange 3.

When the transmission torque exceeds the specified value t; a slippage arises in the friction material 17 to produce an angle of delay $\theta_1$ corresponding to this slippage, the side plates 5 and 6 are further twisted largely in relation to the flange 3, all the springs 20 and 21 are compressed in between the hole inside edges 45' and 46' of the side plates 5 and 6 and the hole inside edges 47 of the flange 3, and the torque begins to be transmitted from the plates 5 and 6 through all the springs 20 and 21 to the flange 3.

In this instance, after the spring 21 moves by a length of the clearance $L_5$ due to the torsion between the side plates 5 and 6 and the flange 3, the spring 21 is compressed to cause the friction washer 17a, the stud pin 18 having a delay angle $\theta_3°$ corresponding to $\theta_1° + L_7'$, to be twisted in the same manner. And some time later, the friction washer 17a rotates in the direction of R corresponding to a clearance $L_7'$, and the through hole 61 for the friction washer 17a presses on the stud pin 18. Consequently, the angle of delay $\theta_1$ set, for example, to $0.05° \sim 0.7°$ at the initial state of generation of the second stage hysteresis in FIG. 4 decreases from a conventional angle of delay $\theta_2$ set by a rotation angle corresponding to the clearances $L_7$ and $L_7'$, i.e. by $2 \times \theta_3$.

Beyond the angle of delay $\theta_1$, the torque is transmitted from the stud pin 18 through the friction washer 17a to the flange 3. In this case, a large hysteresis torque H is produced in the characteristic X due to the slippage of the friction material 17 as shown in FIG. 4. Further, since all the springs 20 and 21 become compressed, a rate of an increase in the twist angle D in relation to an increase in the torque T becomes small to cause a steep gradient of the characteristic X.

When the twist angle reaches 8°, the stop pin 12 contacts with a notch inside edge 40 of the flange 3 to prevent a further torsion.

Next, when the torque T decreases down to 0 kgm, the twist angle D also becomes 0°, and the gradient of characteristic X alters in two stages and the hysteresis torque also alters in two stages during that period. When the torque T increases from 0 kgm in the reverse direction, each part functions reversely to the above case and the twist angle D increases up to maximum 7°. The angle of delay $\theta_1$ is produced as mentioned above at a boundary of twisting angle 2° during that period, then the gradient and hysteresis torque of the characteristic X change in two stages.

Effect of the Invention

As described above, according to the present invention, the engage claws 62 of friction washer 17a and second friction material 17 at both ends of the spring 21, form engage part 63. Friction washer 17a is twisted by the rotation angle $\theta_3$ corresponding to the clearance $L_7$ and $L_7'$ by pressing the engage claw 62 on the spring 21 and the through hole 61 presses on the stud pin 18. The initial angle of delay $\theta_1$, at the initial state of generation of the second-stage hysteresis, can be set to a rotation angle which is delayed by $2 \times \theta_3$ from the conventional angle of delay $\theta_2$. The 'humming sound' can be prevented by setting the angle of delay $\theta_1$ to a proper rotation angle, and a more silent clutch can be provided.

Moreover, since the angle of delay $\theta_1$ has already been set at the initial state of generation of the second-stage hysteresis, breakages of the stud pin 18 and the sub-plates 16 can be avoided to maintain a clutch strength at a high level.

Figure 5A:
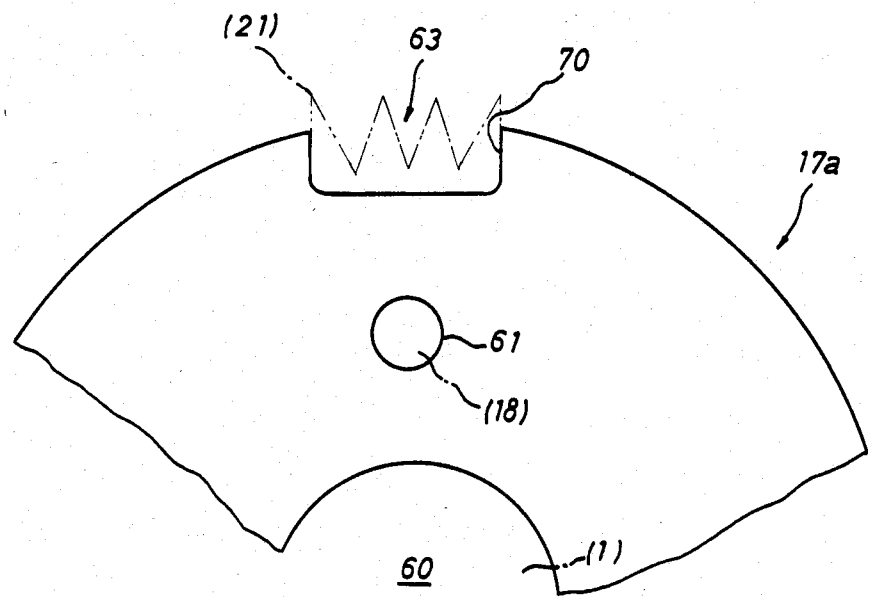
FIG. 5a is a partial plan view showing another embodiment of the friction washer.
Figure 6:
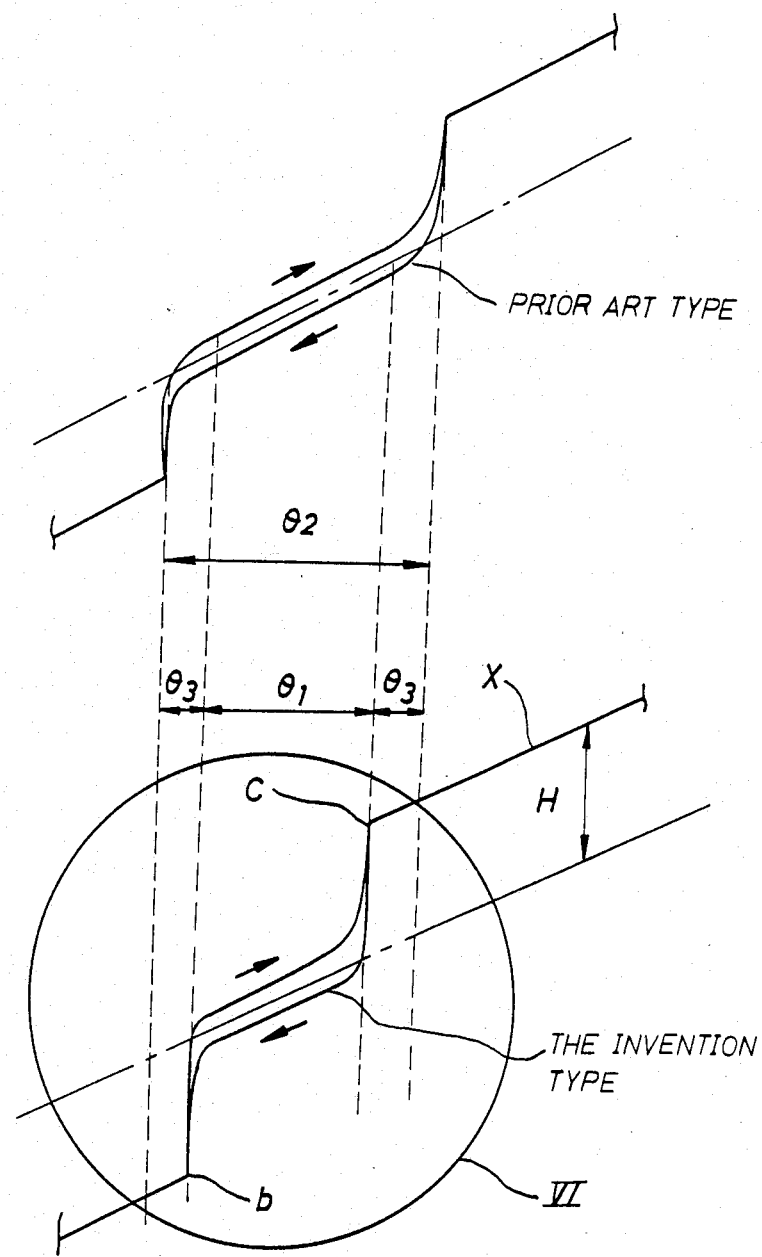
FIG. 6 is an enlarged view of VI part of FIG. 4.

Another embodiment (1) The engage part 63 may not necessarily be limited to that formed by the engage claw 62, but may be made engage with the spring 21 by forming a recession 70 at an outer peripheral edge of the friction washer 17a as shown in FIG. 5a.

(2) The present invention is applicable not only to the damper disc of the clutch but to that of an automatic transmission.

What is claimed is:

1. A damper disc having a splined hub, said hub having a radial flange, annular side plates disposed on said hub at opposite sides of said flange and annular sub-plates disposed on said hub at the sides of said side plates opposite the side at said flange, said flange and said side plates having a plurality of aligned, equally spaced, circumferentially extending openings, the openings in said flange being longer in the circumferential direction of said flange that the openings in said side plates, a pair of torsion springs in each of said aligned openings, first friction members between said flange and said side plates, second friction members between said side plates and said sub-plates, a plurality of equally spaced, circumferentially elongated first slots extending through said flange radially inward of said flange, a spacer pin in each of said first slots extending through said first slots into aligned holes in said first friction member and said side plates for spacing said side plates at the opposite sides of said flange, a plurality of equally spaced, circumferentially elongated second slots extending through said flange at the outer periphery of said flange, a stop pin in each of said second slots extending through said second slots and interconnecting said side plates at the opposite sides of said hub flange, a plurality of equally spaced, circumferentially elongated third slots extending through said flange intermediate said first slots and aligned circumferentially elongated slots extending through said first friction members, said side plates and said second friction members and a stud pin in each of said third slots extending through said aligned elongated slots and interconnecting said sub-plates at the opposite outer sides of said friction members and said side plates for causing relatively heavy friction engagement with said second friction member between said sub-plates and said side plates and for causing relatively light friction engagement with said first friction member between said side plates and said hub flange spaced with respect thereto by said spacer pins, said second friction member having engaging means at the outer periphery of said second friction member for engaging the opposite ends of one of said torsion springs of said pair of torsion springs.

2. A damper disc as recited in claim 1, in which said engaging means on said second friction member comprises a plurality of engaging claws extending outwardly from the outer periphery of said second friction members.

3. A damper disc, as recited in claim 1, in which said engaging means on said second friction member comprises a circumferentially extending recess in the outer periphery of said second friction member.

4. A damper disc as recited in claim 2 in which said pair of torsion springs in each of said aligned openings includes a larger diameter outer spring and a smaller diameter inner spring, said engaging claws of said second friction members engaging the opposite ends of said larger diameter outer spring; and the length of said opening in said flange between said flange and said torsion springs being less than the length between an edge of said third slots in said flange and said spacer pin in said third slots by an angle of delayed rotation of said side plates of said damper disc relative to said flange of said damper disc of from about 0.05 degrees to about 0.7 degrees.

5. A damper disc as recited in claim 4 in which said aligned elongated slots comprise aligned slots in said first friction members, aligned slots in said sides plates, and aligned sots in said second friction members, said aligned slots in said second friction members being shorter than said third slots in said flange.

6. A damper disc as recited in claim 5, wherein said side plates and said flange are rotatable in a first positive circumferential direction and in a reverse negative circumferential direction; a distance between one edge of said opening and one end of said smaller diameter inner spring in said first positive direction is 3 degrees and a distance between the opposite edge of said opening and the opposite end of said smaller diameter inner spring in said reverse negative direction is 2 degrees; a distance between one edge of said aligned slots in said side plates and said stud pins in said first positive direction is 5 degrees and a distance between the opposite edge of said aligned slots in said side plates and said stud pins in said reverse negative direction is 5 degrees; and, a distance between one edge of said second slots and said stop pins in said first positive direction is 8 degrees and a distance between the opposite edge of said second slots and said stop pins in said reverse negative direction is 7 degrees.

* * * * *